United States Patent [19]

Anstock et al.

[11] Patent Number: 4,786,402

[45] Date of Patent: Nov. 22, 1988

[54] PREPARATION OF MEDICINAL WHITE OILS AND MEDICINAL PARAFFINS

[75] Inventors: Thomas Anstock, Weisenheim; Walter Himmel, Gruenstadt; Matthias Schwarzmann, Limburgerhof; Heinz Dreyer, Ludwigshafen; Ulrich Lebert, Hettenleidelheim; Ansgar Eisenbeis, Georgsmarienhuette, all of Fed. Rep. of Germany

[73] Assignee: BASF Aktiengesellschaft, Fed. Rep. of Germany

[21] Appl. No.: 82,139

[22] Filed: Aug. 6, 1987

[30] Foreign Application Priority Data

Aug. 30, 1986 [DE] Fed. Rep. of Germany ....... 3629631

[51] Int. Cl.$^4$ .............................................. C10G 45/04
[52] U.S. Cl. ..................... 208/443; 208/144; 208/145; 208/151; 208/155; 208/268; 208/14; 208/57; 502/50; 502/53; 502/55
[58] Field of Search ............... 208/143, 144, 145, 151, 208/155, 268, 14, 57; 502/50, 53, 55

[56] References Cited

U.S. PATENT DOCUMENTS

| | | | |
|---|---|---|---|
| 2,459,465 | 1/1944 | Smith | 208/57 |
| 2,882,220 | 4/1959 | Mikeska et al. | 208/268 |
| 3,130,240 | 4/1964 | Stark | 208/143 |
| 3,211,669 | 10/1965 | Unverferth | 208/143 |
| 3,228,993 | 1/1966 | Kozlowski et al. | 208/143 |
| 3,340,181 | 9/1967 | Diringer et al. | 208/143 |
| 3,459,656 | 8/1969 | Rausch | 208/57 |
| 3,642,656 | 2/1972 | Hayes et al. | 252/419 |
| 3,681,233 | 8/1972 | Mills et al. | 208/143 |
| 3,882,049 | 5/1975 | Bertolacini et al. | 208/89 |
| 3,959,122 | 5/1976 | Mills et al. | 208/14 |
| 4,072,603 | 2/1978 | Wentzheimer | 208/14 |
| 4,101,599 | 7/1978 | Debande et al. | 585/255 |
| 4,263,225 | 4/1981 | Carter et al. | 585/276 |
| 4,325,804 | 4/1982 | Everett et al. | 208/143 |
| 4,469,590 | 9/1984 | Schucker et al. | 208/143 |

FOREIGN PATENT DOCUMENTS

| | | |
|---|---|---|
| 0092059 | 10/1983 | European Pat. Off. |
| 0096289 | 12/1983 | European Pat. Off. |
| 1645791 | 5/1970 | Fed. Rep. of Germany |
| 301728 | 8/1972 | Fed. Rep. of Germany |

Primary Examiner—H. M. S. Sneed
Assistant Examiner—Helane Myers
Attorney, Agent, or Firm—Keil & Weinkauf

[57] ABSTRACT

Medicinal white oils and medicinal paraffins are prepared from petroleum fractions containing aromatics and nitrogen, oxygen and sulfur compounds, e.g. light and heavy atmospheric gas oils, vacuum gas oils and residues, which have been pretreated in a first stage by acid treatment or catalytic hydrogenation, by hydrogenation in a second stage over a nickel-containing catalyst under from 50 to 200 bar and at elevated temperatures, by a process in which the catalyst used in the second stage and present in the oxide form is reduced with a hydrogen-containing gas, passivated and then again activated with hydrogen, before the hydrogenation to medicinal white oils or paraffins is carried out.

10 Claims, No Drawings

PREPARATION OF MEDICINAL WHITE OILS AND MEDICINAL PARAFFINS

The present invention relates to a process for the preparation of medicinal white oils and paraffins by catalytic hydrogenation using a nickel-containing catalyst. In this process, a pretreatment is employed to increase the activity of the catalyst and prolong its life.

Medicinal white oils and paraffins are highly refined petroleum fractions which are free of oxygen compounds, nitrogen compounds and sulfur compounds and contain virtually no aromatics. They are used for the preparation of cosmetics and drugs and in the food sector. For this purpose, products have to have a neutral flavor and be odorless, colorless and substantially chemically inert, ie. in particular they must not contain any toxic substances, such as aromatics. The requirements which paraffins and white oil have to meet are defined by specifications, as laid down, for example, by the Food and Drug Administration (FDA) in the USA or by the German Pharmacopoeia (Deutsches Arzneimittelbuch, DAB) or the communications of the Federal Board of Health (Bundesgesundheitsamt, BGA) in the Federal Republic of Germany.

White oils are obtained from petroleum fractions which boil at above about 200° C. Where the contents of aromatics and hetero compounds are high, the oils may be subjected to solvent refining, for example with furfurol or N-methylpyrrolidone, in order to reduce the content of aromatics. In order to depress the pour point, these fractions are generally subjected to dewaxing.

On the one hand, paraffins are obtained in the dewaxing of oil distillates, mainly lubricating oil fractions, and on the other hand they are separated off from residues which are generally freed from asphalts beforehand by deasphalting. Dewaxing can be carried out, for example, by means of solvents such as methyl ethyl ketone/toluene mixtures or chlorohydrocarbons, or using urea.

Paraffins have to meet various criteria. For example, in Germany, paraffins are divided into microcrystalline and macrocrystalline waxes on the basis of their solidification point or their viscosity, and each of these waxes must satisfy different specifications. To meet different requirements, industrial crude paraffins are deoiled to different extents, so that they have oil contents of from 0.2 to 20% by weight.

In earlier processes for the preparation of white oils and paraffins, petroleum fractions were processed to industrial white oils or paraffins by a single acid treatment, or to medicinal white oils or paraffins by repeated acid treatment followed by treatment with a bleaching earth. Instead of sulfuric acid, it is also possible to use oleum. These processes have recently been replaced by hydrogenation methods since the latter give higher yields on the one hand and, on the other hand, are environmentally more compatible.

The known modern processes are based on a multistage catalytic hydrogenation method. German Pat. No. 2,366,264 and European Pat. No. 96,289 describe a two-stage process in which petroleum fractions boiling in the range from 200° to 550° C. are hydrogenated to medicinal white oils. In the first hydrogenation stage, the starting oils, which may or may not have been subjected to solvent refining beforehand, are refined to technical grade white oils in the presence of a sulfur-resistant hydrogenation catalyst. In a second state, these white oils are hydrogenated to medicinal quality over a catalyst which consists of a metal of group VIII of the Periodic Table on a refractory oxide carrier. According to German Laid-Open Application DOS No. 1,645,791, a noble metal catalyst is used in the second hydrogenation stage.

In the production of medicinal white oils and paraffins, it is desirable to reduce the content of aromatics to a value which does not exceed the maximum limit imposed by the relevant regulations. The catalyst used for this hydrogenation must have high hydrogenating activity even at low temperature, since elevated temperatures shift the thermodynamic equilibrium toward dehydrogenation to aromatics. Moreover, undesirable cleavage reactions occur at elevated temperatures, leading to a deterioration in product quality, for example a reduction in the viscosity, flashpoint and/or boiling curve.

The invention is based on a process for the preparation of medicinal white oils and medicinal paraffins from petroleum fractions containing aromatics and nitrogen, oxygen and sulfur compounds, eg. light and heavy atmospheric gas oils, vacuum gas oils and residues, which have been pretreated in a first stage by acid treatment or catalytic hydrogenation, by hydrogenation in a second stage over a nickel-containing catalyst under from 5 to 20 MPa and at from 160 to 330°0 C., a space velocity of from 0.1 to 2.0 kg of oil per liter of catalyst per hour and a gas/oil ratio of from 0.1 to 1.0 $m^3$ (S.T.P.)/kg.

The present invention relates to a process of this type in which the nickel catalyst used in the second stage and initially present in the oxide form is first reduced at from 350 to 530° C. with hydrogen or a hydrogencontaining gas, then passivated, without exceeding 450° C., and again activated with hydrogen at above 150° C., before the hydrogenation to a medicinal white oil or a paraffin is carried out.

In the catalysts for the second hydrogenation stage, the active hydrogenating metals are generally in their oxide form after the catalyst has been prepared. Before start-up, the catalyst must be subjected to an activation treatment with hydrogen in order to obtain its full hydrogenation activity. The passivation may be effected using carbon dioxide, oxygen or steam. During this procedure, some or all of the nickel is again converted to its oxide form. The catalyst acquires its optimum activity only as a result of the subsequent activation.

The reduction is carried out at above 350°0 C. and below 530° C., preferably at from 400 to 470° C., using hydrogen. The novel passivation must be carried out in such a way that the temperatures do not exceed 450° C. and are preferably from 20 to 250° C. The heat of reaction generated in the passivation with carbon dioxide is controlled to keep the temperature within these limits, this being done by regulating the amount of carbon dioxide. If the passivation is effected with carbon dioxide, heating-up may occur when the catalyst subsequently comes into contact with air. In order to avoid this, the catalyst can be transported and introduced into the reactor under a protective gas atmosphere. After the passivation with carbon dioxide, the catalyst is therefore preferably treated with a nitrogen/air mixture in order to be able to control any heat of reaction which may be generated during this process. This aftertreatment with a nitrogen/air mixture after the passivation with carbon dioxide results in a markedly lower level of heat evolution than in the case of passivation with oxygen.

The passivation with oxygen is preferably carried out using an oxygen-containing gas, in particular a nitrogen/air mixture. In this procedure, air may be metered into a nitrogen stream so that the temperature increase due to oxidation can be controlled and can be restricted to the preferred temperature range. This temperature control can be carried out, for example, by metering about 2% by volume of air into a nitrogen stream at the beginning. If a reaction no longer takes place at these concentrations, which is detectable from the absence of heat of reaction, the air concentration can be increased stepwise until pure air is used. These measures prevent thermal damage to the catalyst.

In the passivation with steam, a reaction likewise takes place at the catalyst surface with formation of a nickel oxide protective layer, which prevents complete conversion of the metallic nickel to nickel oxide. In this case too, the temperature limits during the passivation are maintained by regulating the amount of steam.

The catalysts passivated in this manner are then in a partially oxidized form and are stable and can be handled in the air. Before these catalysts come on stream, they must again be activated with hydrogen or a hydrogencontaining gas. The activation of the passivated catalysts can be carried out either during the preparation or in situ. In the former case, it is necessary for the catalyst to be transported and introduced into the plant under a protective gas. To avoid the difficulties associated with this, the activation is generally carried out in the plant. Because the catalyst is in a form which is only partially oxidized after the novel passivation, the activation time in the plant is shortened, and the loss of production during start-up with a fresh catalyst is reduced.

The temperature required for activating the passivated catalysts essentially depends on the type of passivation. In the case of passivation with oxygen or steam, activation temperatures above 350° C. are required in order to achieve adequate hydrogenation activity. This entails higher energy consumption and additional time for the heat-up phase and for cooling to the initial operating temperature. On the other hand, after passivation with carbon dioxide, the activation can be carried out at temperatures as low as above 150°0 C., regardless of whether or not the catalyst was subsequently treated with air. This saves, on the one hand, energy for heating up and, on the other hand, the time required for the heating up and cooling phase, which may be from several hours to a few days.

The advantage of the present invention can be utilized in the case of catalysts which essentially consist of nickel oxide on a refractory carrier, the latter consisting of one or more oxide compounds of the elements Al, Si, Mg or Cr or a mixture of these and, if necessary, containing a promoter, such as a compound of Mo or P. Examples of suitable catalysts are those described in European Pat. No. 96,289. The novel process gives on-spec medicinal white oils having the required low content of aromatics and permits long catalyst lives. The content of aromatics is determined by measuring the absorption in UV light at certain wavelengths of wavelength ranges. An undiluted sample, a dilute sample or a sample extracted with, for example, dimethyl sulfoxide is used, depending on the specification.

EXAMPLES

A catalyst whose preparation is described in European Pat. No. 96,289 is used for the Examples below.

The catalyst used in the Examples is obtained from a solution containing waterglass, nitric acid and nickel nitrate by precipitation with a sodium carbonate solution at pH 8, filtration, washing of the residue with water, spray-drying, mixing the product with 5% of cellulose, kneading with the addition of a peptizing agent, molding, drying and subsequent calcination at from 380 to 550° C. The ready-prepared catalyst has a BET specific area of 332 m2/g and a bulk density of 810 g/l. The nickel content of the catalyst in the oxide form is 49%.

EXAMPLE 1

The catalyst described above, in its oxide form, is reduced with hydrogen at 440° C. After cooling to room temperature, the catalyst is passivated with carbon dioxide. The amount of carbon dioxide is regulated so that the temperature of the catalyst does not exceed 80° C. Thereafter, air is passed over the catalyst, during which procedure a maximum temperature increase of 80° C. is permitted. Activation of the catalyst is then carried out at 200° C. with hydrogen.

EXAMPLE 2

The catalyst described above, in its oxide form, is reduced with hydrogen at 440° C. After cooling to room temperature, the catalyst is passivated with an air/nitrogen mixture, the initial air content being 1%, so that the temperature increase can be restricted to 80° C. Activation of the catalyst is then carried out at 440° C. with hydrogen.

EXAMPLE 3

The oxide form of the catalyst described above is reduced with hydrogen at 440° C.

The activities of the catalysts described in Examples 1–3 are compared. To do this, the technical-grade white oil described in Table 1 is hydrogenated under identical reaction conditions in each case.

TABLE 1

| Properties of the technical-grade white oil | |
|---|---|
| Density at 15° C.: | 0.865 g/cm$^3$ |
| Viscosity at 20° C.: | 222.5 mm$^2$/s |
| at 100° C.: | 9.2 mm$^2$/s |
| Sulfur: | 9 ppm by weight |
| Flashpoint: | 248° C. |
| Boiling range | |
| Initial boiling point: | 389° C. |
| 5%: | 438° C. |
| 10%: | 452° C. |
| 30%: | 477° C. |
| 50%: | 490° C. |
| 70%: | 503° C. |
| 90%: | 522° C. |
| 95%: | 532° C. |
| Final boiling point: | 543° C./98% |
| Light absorption DAB 8 | |
| 275 nm: | 150 |
| 295 nm: | 270 |
| 300 nm: | 235 |

EXAMPLE 4

The reaction conditions for comparison of the activities of the three embodiments of the catalyst are summarized in Table 2.

TABLE 2

| Experimental conditions: | |
|---|---|
| Pressure MPa: | 20 |

TABLE 2-continued

| Experimental conditions: | |
|---|---|
| Reaction temperature (°C.): | 170 |
| Throughput (kg per l per h): | 0.2 |
| Gas/oil (m³ (S.T.P.)/kg) | 0.4 |

The residual aromatics content in the reaction products serves as a criterion for the hydrogenation activity. This content is determined according to DAB 8. The light absorption values thus obtained are compared in the Table below:

TABLE 3

| Results | Limiting value | Example 1 | Example 2 | Example 3 |
|---|---|---|---|---|
| Light absorption DAB 8: | | | | |
| 275 nm: | 0.80 | 0.69 | 0.70 | 0.94 |
| 295 nm: | 0.40 | 0.11 | 0.10 | 0.23 |
| 300 nm: | 0.30 | 0.07 | 0.07 | 0.15 |

Further physical data, such as viscosity, flashpoint and the 2% point of the boiling curve, do not alter as a result of the hydrogenation, ie. virtually no cleavage products are produced.

The results show that, under the chosen conditions, which are the same for all experiments, an on-spec medicinal white oil can be obtained only with the catalysts which have been reduced beforehand (Examples 1 and 2).

In order to obtain the same light absorption values with the catalyst of Example 3 as those obtained in Examples 1 and 2, the reaction temperature would have to be 23° C. higher.

The results also show that the catalyst passivated with carbon dioxide and activated at as low as 200° C. (Example 1) gives virtually the same results as that passivated with oxygen and activated at 440° C. (Example 2).

We claim:

1. A process for the preparation of a medicinal white oil or medicinal paraffin from a petroleum fraction containing aromatics and nitrogen, oxygen and sulfur compounds comprising:
    treating, in a first stage, a petroleum fraction containing aromatics and nitrogen, oxygen and sulfur compounds with an acid selected from the group consisting of sulfuric acid and oleum, and
    hydrogenating, in a second step, over a nickel-containing catalyst under from 50 to 200 bar and at from 160 to 330° C., a space velocity of from 0.1 to 2.0 kg of oil per liter of catalyst per hour and a gas/oil ratio of from 0.1 to 1.0 m³/kg to form a medicinal white oil or medicinal paraffin,
    wherein the nickel catalyst, initially present in the oxide form, is first reduced at from 350 to 530° C. with hydrogen or a hydrogen-containing gas, then passivated, without exceeding 450° C., and again activated at above 150° C. with hydrogen, before hydrogenating to said medicinal white oil or medicinal paraffin.

2. The process of claim 1 wherein said petroleum fraction is selected from the group consisting of light atmospheric gas oil, heavy atmospheric gas oil, vacuum gas oil and vacuum gas residue.

3. The process of claim 1 wherein the passivation is carried out using carbon dioxide.

4. The process of claim 1 wherein the passivation is carried out using oxygen.

5. The process of claim 1 wherein the passivation is carried out using steam.

6. A process for the preparation of a medicinal white oil or medicinal paraffin from a petroleum fraction containing aromatics and nitrogen, oxygen and sulfur compounds comprising:
    catalytically hydrogenating, in a first stage, a petroleum fraction containing aromatic and nitrogen, oxygen and sulfur compounds, and
    hydrogenating, in a second step, over a catalyst under from 50 to 200 bar and at from 160° to 330° C., a space velocity of from 0.1 to 2.0 kg of oil per liter of catalyst per hour and a gas/oil ratio of from 0.1 to 1.0 m3/kg to form a medicinal white oil or medicinal paraffin,
    wherein the nickel catalyst, initially present in the oxide form, is first reduced at from 350° to 530° C. with hydrogen or a hydrogen-containing gas, then passivated, without exceeding 450° C., and again activated at above 150° C. with hydrogen, before hydrogenating to said medicinal white oil or medicinal paraffin.

7. The process of claim 6 wherein said petroleum fraction is selected from the group consisting of light atmospheric gas oil, heavy atmospheric gas oil, vacuum gas oil and vacuum gas residue.

8. The process of claim 6 wherein the passivation is carried out using carbon dioxide.

9. The process of claim 6 wherein the passivation is carried out using oxygen.

10. The process of claim 6 wherein the passivation is carried out using steam.

* * * * *